(12) United States Patent
So

(10) Patent No.: US 10,125,505 B2
(45) Date of Patent: Nov. 13, 2018

(54) SCAFFOLDING

(71) Applicant: Yu Shing So, Aberdeen (HK)

(72) Inventor: Yu Shing So, Aberdeen (HK)

(73) Assignee: WLS INTELLECTUAL PROPERTY LIMITED, Hong Kong (HK)

( * ) Notice: Subject to any disclaimer, the term of this patent is extended or adjusted under 35 U.S.C. 154(b) by 0 days.

(21) Appl. No.: 13/905,801

(22) Filed: May 30, 2013

(65) Prior Publication Data

US 2013/0319797 A1    Dec. 5, 2013

(30) Foreign Application Priority Data

Jun. 1, 2012 (HK) ................................. 12105369

(51) Int. Cl.
| | |
|---|---|
| *E04G 7/32* | (2006.01) |
| *E04G 7/00* | (2006.01) |
| *E04G 3/32* | (2006.01) |
| *E04G 7/22* | (2006.01) |
| *E04G 7/34* | (2006.01) |
| *E04G 25/06* | (2006.01) |
| *E04G 5/04* | (2006.01) |
| *E04G 1/15* | (2006.01) |
| *E04G 5/00* | (2006.01) |
| *F16C 11/04* | (2006.01) |

(52) U.S. Cl.
CPC ............... *E04G 7/00* (2013.01); *E04G 1/15* (2013.01); *E04G 3/325* (2013.01); *E04G 5/007* (2013.01); *E04G 5/046* (2013.01); *E04G 7/22* (2013.01); *E04G 7/32* (2013.01); *E04G 7/34* (2013.01); *E04G 25/065* (2013.01); *F16C 11/04* (2013.01); *Y10T 29/49826* (2015.01); *Y10T 403/32951* (2015.01)

(58) Field of Classification Search
CPC .................................. E04G 7/307; E04G 7/32
See application file for complete search history.

(56) References Cited

U.S. PATENT DOCUMENTS

| | | | |
|---|---|---|---|
| 4,782,915 A * | 11/1988 | King | 182/129 |
| 8,757,321 B2 * | 6/2014 | Patterson | B60P 7/0853 182/82 |
| 2004/0231922 A1 * | 11/2004 | Schwoerer | 182/178.1 |
| 2011/0262215 A1 | 10/2011 | Thacker | |

FOREIGN PATENT DOCUMENTS

| | | | |
|---|---|---|---|
| EP | 147496 A1 * | 7/1985 | |
| EP | 1785549 A1 * | 5/2007 | |
| WO | WO 2009123567 A2 * | 10/2009 | E04G 7/307 |

\* cited by examiner

*Primary Examiner* — Alvin C Chin-Shue
(74) *Attorney, Agent, or Firm* — Ostrolenk Faber LLP

(57) ABSTRACT

The invention relates to a bridge that is for use with a scaffolding standard. The standard may comprise of an elongate pipe to which there is secured at least one rosette of a kind that presents a plurality of apertures about the pipe at which a connection to said standard can be established by other scaffolding components. The bridge is capable of connection to said rosette at at least two said apertures, said bridge allowing a scaffolding component to be secured thereto to be positioned and supported by said bridge at a location not catered for by any aperture of said rosette.

11 Claims, 12 Drawing Sheets

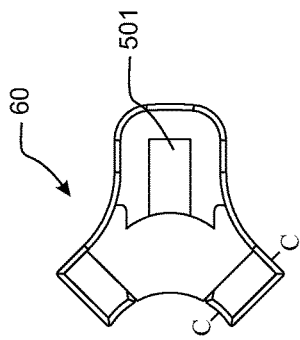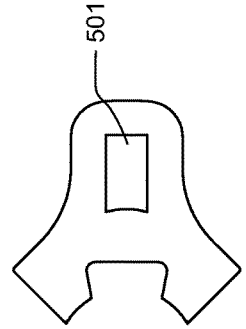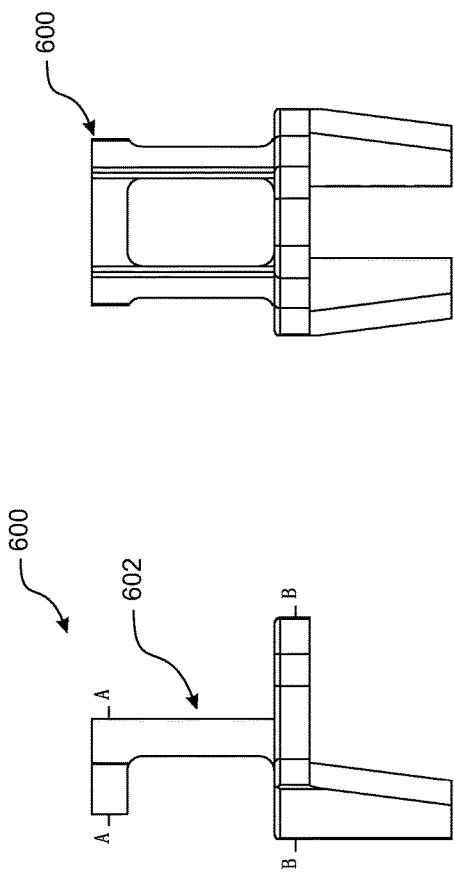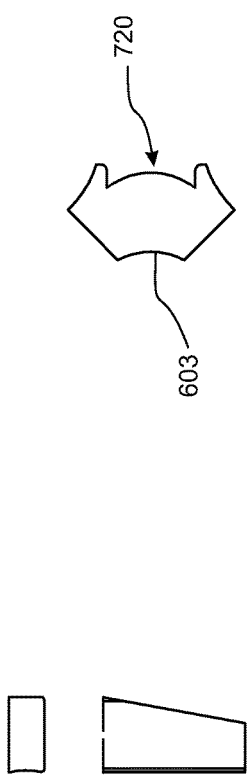
FIGURE 23
FIGURE 26
FIGURE 22
FIGURE 25
FIGURE 21
FIGURE 24

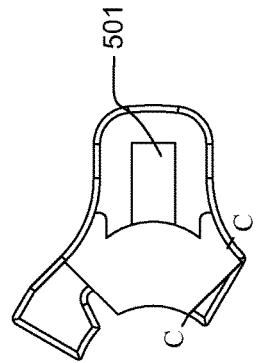
FIGURE 29
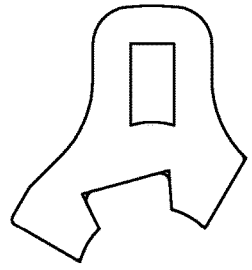
FIGURE 32
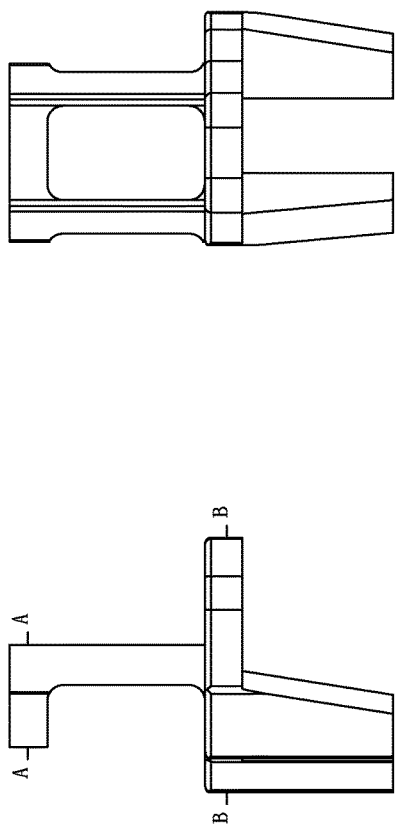
FIGURE 28
FIGURE 31
FIGURE 27
FIGURE 30

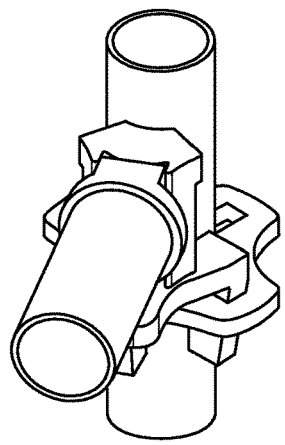 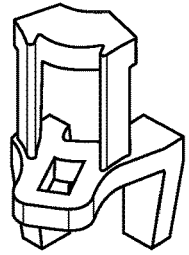
FIGURE 34a        FIGURE 34b
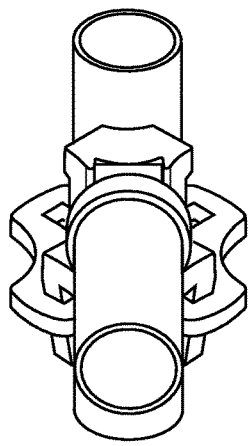 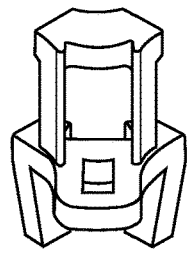
FIGURE 35a        FIGURE 35b
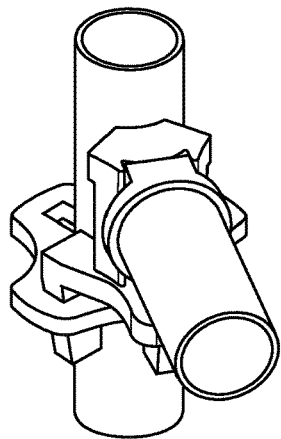 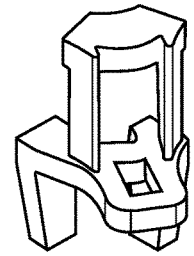
FIGURE 36a        FIGURE 36b

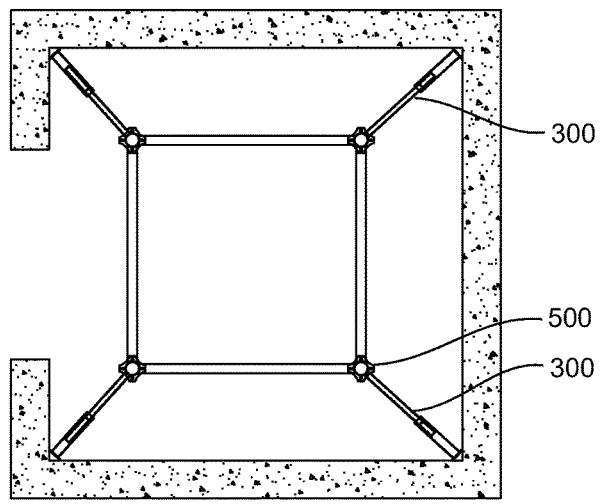
FIGURE 37
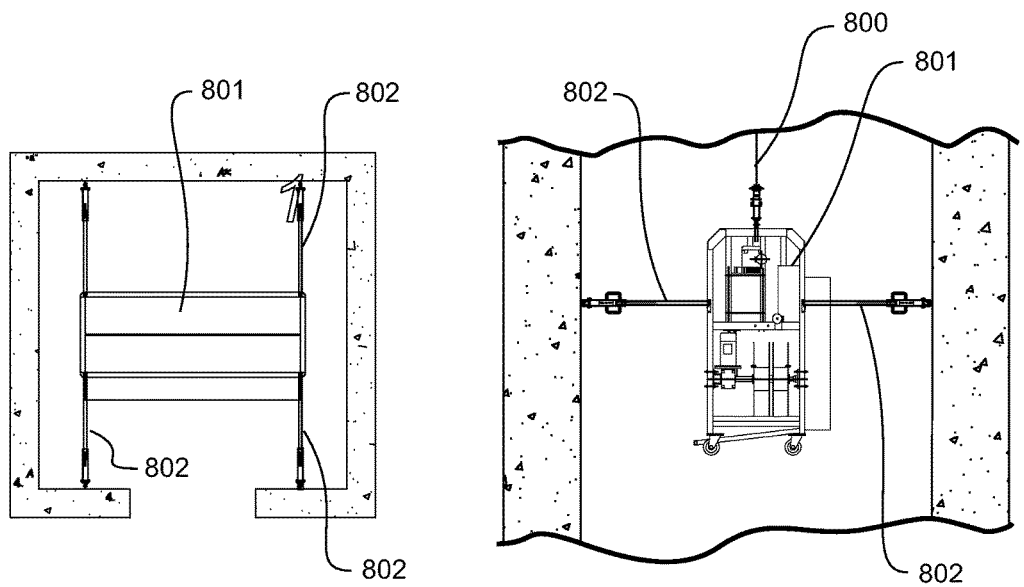
FIGURE 39  FIGURE 40

SCAFFOLDING

FIELD OF THE INVENTION

The present invention relates to improvements in scaffolding.

BACKGROUND

Pipe and clamp type scaffolding systems are extensively used in the building sector. They are able to be easily adapted to conform to confined spaces and provide a modest amount of flexibility in terms of the shape of scaffolding structures that can be constructed. However these systems require significant expertise to erect correctly and are usually erected by experienced people, largely because of the large degree of flexibility that is available. This requires for expert knowledge to ensure a correctly erected scaffolding structure is put in place. Modular systems remove the need for such high degree of expertise. Modular systems consist of prefabricated components usually of specific lengths and are inter-operative and inter-connectable with each other. With increasing labour costs there is a preference for scaffolding systems to be easy to erect.

Modular systems will comprise of a number of different components that can be connected together to form at least part of a scaffold structure. Such a scaffold structure may comprise of a plurality of standards 1 as shown in FIG. 1 that may be connected together via ledgers 2. Ledgers may also be referred to as transoms. A scaffold structure may also include guard rails 3. The standards, ledgers and guardrails are preferably made from metal pipe.

A scaffolding system exists that allows for the connection of ledgers, transoms and standards in a convenient manner. Such is shown with reference to FIGS. 1 to 5. Standards 1 may have nodal points 5 provided at at least one and preferably a plurality of separated locations along its length. The nodal points are defined by a rosette 6. This is a ring-like member as shown in FIG. 2. The rosette 6 has a central aperture 7 through which the pipe part of a standard extends. The rosette 6 is usually welded to the standard so as to be secured in place. The rosette 6 may be of a planar configuration. Its plane extends in a direction such that the elongate direction of the standard 1 is normal thereto. The rosette 6 includes at least one and preferably a plurality of holes. These may be in the form of slots 8. With the rosette 6 engaged to a standard the slots preferably project radially outward from the standard. The pipe part of a standard may define part of the boundary of the slot 8.

The rosette 6 shown in FIG. 2 includes four slots, each equispaced and extending radially away from the standard. The four slots facilitate right angled connections of ledgers to the vertical standard. Some rosettes may include more slots, but the more slots that are included, the weaker the rosette becomes.

FIG. 3 illustrates a ledger 2 that includes a head at each of its distal ends. Such a head may comprise projections 10. These projections 10 are of a shape to allow for these to be located into a slot 8 of a rosette 6. Each projection 10 may be welded to the end of the pipe section of the ledger. The projection 10 presents a leg 11 that can be received into a slot 8 of a rosette 6. The projection 11 may be tapered so that it can be conveniently located into the slot and become wedged to the standard. An aperture 12 may be provided through the projection 11 to allow for a fastener to extend through. Such can ensure that the ledger cannot be removed from the rosette 6. The fastener may for example be a split pin or ring or other arrangement that can help secure the ledger to the ring member 6. As can be seen in FIG. 7 where a rosette 6 has four slots, it is possible for four ledgers to each extend therefrom and away from the standard. Ledgers 2 are of a fixed length so that the distance between adjacent erected standards is fixed.

The projections 10 are planar member (usually cut from a sheet metal). The complimentary shaped slot 8 results in a snug fit being established between the projection 10 and the rosette 6 so as to ensure that the direction which the ledger extends from the standard is fixed. This assists in the construction process of the scaffold structure and provides some degree of rigidity to the scaffold structure.

Alternatively, the head may be of a configuration to slide over the rosette and has an aperture that can align with the slots of the rosette and a separate wedge can then be inserted through both the head and the rosette slots to couple the ledger to the standard. This is shown for example in US 2011/0262215.

The location of complimentary shaped wedge or projection of a ledger with a slot of a rosette will ensure that little or no play exists between the ledger and the standard.

In the example as shown in FIGS. 1-5 ledgers can only extend at right angles or parallel to each other from a standard.

For scaffolding erected adjacent a building structure or more particularly for a scaffolding erected inside an elevator shaft of a building, it is important for the structure to be tied to the building so as to receive some stability from the building structure. In particular, lateral stability.

To achieve this support from a building structure short arms are typically used to extend between the scaffolding and the walls of the elevator shaft. Towards one end of a short arm a clamp coupling is usually used to secure the short arm to a ledger or standard of the scaffolding structure. The other end of the arm may be provided with an anchoring plate adapted to be bolted to a wall of the elevator shaft. Disadvantages of this way of laterally stabilising a scaffold structure include:

a) a significant amount of work is required to connect the short arms to the scaffolding structure,
b) the arm may not be firmly secured to the scaffolding because of a loose clamp coupling,
c) short arms of different lengths may have to be used or may need to be trimmed onsite to ensure that it is of a suitable length for providing the lateral stability,
d) the scaffolding may still not be fully secured in a lateral direction as equal and opposite forces may need to be exerted onto the scaffolding in a horizontal direction in order to keep the scaffolding firmly positioned in the elevator shaft.

For other building elements located adjacent a building, support may be required from time to time from the building structure also. For example for a swing stage suspended adjacent a building and that may travel up a down a building for maintenance, window cleaning and similar, the swing stage may be desirous of contact with the building to reduce the degree of undesired movement of the swing stage. Such support will need to cater for the fact that the swing stage travels up and down relative the building.

It is accordingly an object of the present invention to provide at least one component for a modular scaffolding system that address one or more of the abovementioned disadvantages and/or to provide the public with a useful choice.

BRIEF DESCRIPTION OF THE INVENTION

Accordingly in a first aspect the present invention may be said to be, for use with a scaffolding standard that comprises an elongate pipe to which there is secured at least one rosette of a kind that presents a plurality of apertures about the pipe at which a connection to said standard can be established by other scaffolding components, a bridge capable of connection to said rosette at at least two said apertures, said bridge allowing a scaffolding component to be secured thereto to be positioned and supported by said bridge at a location not catered for by any aperture of said rosette.

Preferably the scaffolding component capable of connecting to said bridge is capable also of connecting the rosette at said apertures.

Preferably said bridge is adapted and configured to allow a scaffolding component to be secured there to at a location not catered for by any aperture of said rosette by presenting a fastening region at a location different to any said aperture of said rosette.

Preferably the fastening region is located intermediate of two adjacent apertures of said rosette with which said bridge can locate.

Preferably the fastening region is located radially intermediate of two adjacent apertures of said rosette with which said bridge can locate.

Preferably said fastening region is of a shape to be complementary with part or parts of said scaffolding component(s) that connect to said apertures of said rosette.

Preferably said fastening region is an aperture of the same aperture plan shape as the aperture of said rosette.

Preferably the fastening region is of the same shape as the region of said rosette about said aperture of said rosette.

Preferably the fastening region is a slot shaped aperture.

Preferably the slot of the bridge has an elongate direction.

Preferably fastening region is a slot shaped aperture, the slot having an elongate direction that lies in a notional plane that is also parallel to the elongate direction of a standard, the notional plane not passing through the apertures of the rosette with which the bridge is engaged when in use.

Preferably the notional plane is intermediate of the two apertures of the rosette with which the bridge is engaged.

Preferably the notional plane is midway of the two apertures of the rosette with which the bridge is engaged.

Preferably the slot of the bridge has an elongate direction that, when the bridge is in use, does not pass through any aperture of the rosette with which the bridge is engaged.

Preferably the elongate direction passes between two adjacent apertures of said rosette when said bridge is in use.

Preferably the elongate direction is radial to said pipe.

Preferably said bridge comprising a bridging portion from which there is disposed two prongs that are spaced apart in a manner to be presented to allow their registration at two apertures of said rosette.

Preferably the prongs project in a direction that is parallel to each other and in the same direction as each other.

Preferably said bridge comprising a bridging portion from which there is disposed two bridge abutments one on each side of said bridging portion that are spaced apart in a manner to be presented to allow their registration at two apertures of said rosette and to engage against the pipe to gain lateral support of said bridge from said pipe.

Preferably the bridge portion and the prongs are shaped and configured so as to allow the bridge portion to rest on said rosette when said prongs are fully engaged with a respective aperture.

Preferably the prongs can each be pushed into a respective aperture of said rosette, preferably simultaneously.

Preferably the prongs are shaped and configured so at engage with the pipe of a standard when fully engaged into a respective aperture of the rosette of the standard.

Preferably the bridge portion spans between the prongs.

Preferably the bridge portion defines at least one aperture therethrough to define said at least one said fastening region.

Preferably the at least one aperture through said bridge portion is located to be positioned at a radial distance away from said pipe of said standard that is greater than where the apertures of said rosette are provided.

Preferably the bridge is at least partially staple shaped.

Preferably the bridge portion is substantially planar.

Preferably the bridge is a cast metal item.

Preferably the bridge is a unitary item.

Preferably the bridge is a fabricated item.

Preferably the bridge portion defines a landing on which said scaffolding component can rest when engaged at the aperture of said bridge.

Preferably said bridge also comprises pipe abutment upwardly located from said bridge portion, to abut the pipe of the standard at a location above said bridge portion when in use.

In a further aspects the present invention may be said to be a modular scaffolding system that comprises:

a. a scaffolding standard comprising an elongate pipe to which there is secured at least one rosette of a kind that presents a plurality of apertures about the pipe at which a connection to said standard can be established by other scaffolding components, and b. a ledger that includes at each of its distal ends a head that is of a shape and configuration to allow it to be secured (whether on its own or with another element) at said rosette at a said aperture thereof, and c. a bridge capable of connection to said rosette at at least two said apertures, said bridge allowing a said ledger or other scaffolding component to be secured thereto at a location not catered for by any aperture of said rosette.

Preferably the other scaffolding component capable of connecting to said bridge is capable also of connecting the rosette at said apertures.

Preferably the other scaffolding component is the support arm as herein described.

Preferably said bridge is adapted and configured to allow said ledger to be secured thereto to be supported by said pipe at a location not catered for by any aperture of said rosette by presenting a fastening region of said bridge at a location different to any said aperture of said rosette.

Preferably the fastening region is located to locate intermediate of two adjacent apertures of said rosette.

Preferably the fastening region is located to locate radially intermediate of two adjacent apertures of said rosette.

Preferably said fastening region is of a shape complementary to part of parts of said ledger that can also connect to said apertures of said rosette.

Preferably said fastening region is an aperture of the same aperture plan shape as the aperture of said rosette.

Preferably the fastening region is of the same shape as the region of said rosette about said aperture of said rosette.

Preferably the fastening region is a slot shaped aperture.

Preferably the slot of the bridge has an elongate direction.

Preferably the elongate direction, when the bridge is engaged to a rosette, lies in a notional plane that is also parallel to the elongate direction of a standard, the notional plane not passing through the apertures of the rosette with which the bridge is engaged.

Preferably the fastening region is a slot shaped aperture, the slot having an elongate direction that lies in a notional plane that is also parallel to the elongate direction of a standard, the notional plane not passing through the apertures of the rosette with which the bridge is engaged when in use.

Preferably the notional plane is intermediate of the two apertures of the rosette with which the bridge is engaged.

Preferably the notional plane is midway of the two apertures of the rosette with which the bridge is engaged.

Preferably the slot of the bridge has an elongate direction that, when the bridge is in use, does not pass through any aperture of the rosette with which the bridge is engaged.

Preferably the elongate direction passes between two adjacent apertures of said rosette when said bridge is in use.

Preferably the elongate direction is radial to said pipe.

Preferably said bridge comprising a bridging portion from which there is disposed two prongs that are spaced apart in a manner to be presented to allow their registration at two apertures of said rosette.

Preferably the prongs project in a direction that is parallel to each other and in the same direction as each other.

Preferably said bridge comprising a bridging portion from which there is disposed two bridge abutments one on each side of said bridging portion that are spaced apart in a manner to be presented to allow their registration at two apertures of said rosette and to engage against the pipe to gain lateral support of said bridge from said pipe.

Preferably the bridge portion and the prongs are shaped and configured so as to allow the bridge portion to rest on said rosette when said prongs are fully engaged with a respective aperture.

Preferably the prongs can each be pushed into a respective aperture of said rosette, preferably simultaneously.

Preferably the prongs are shaped and configured so at engage with the pipe of a standard when fully engaged into a respective aperture of the rosette of the standard.

Preferably the bridge portion spans between the prongs.

Preferably the bridge portion defines at least one aperture therethrough to define said at least one said fastening region.

Preferably the at least one aperture through said bridge portion is located to be positioned at a radial distance away from said pipe of said standard that is greater than where the apertures of said rosette are provided.

Preferably the bridge is at least partially staple shaped.

Preferably the bridge portion is substantially planar.

Preferably the bridge is a cast metal item.

Preferably the bridge is a unitary item.

Preferably the bridge is a fabricated item.

Preferably the bridge portion defines a landing on which said ledger or other scaffolding component can rest when engaged at the aperture of said bridge.

Preferably said bridge also comprises pipe abutment upwardly located from said bridge portion, to abut the pipe of the standard at a location above said bridge portion when in use.

Preferably the system comprises a plurality of ledgers, standards and bridges.

In a further aspect the present invention may be said to be a scaffold structure that comprises:
  a. a plurality of scaffolding standards that each comprise of an elongate pipe to which there is secured at least one rosette of a kind that presents a plurality of apertures about the pipe at which a connection to said standard can be established by other scaffolding components, and
  b. a plurality of ledgers that are each secured at a said rosette at a said aperture thereof by virtue of each ledger having at its distal ends a head that is of a shape and configuration to allow it to be so secured, and
  c. a bridge connected to a said rosette at at least two said apertures thereof, said bridge securing a said ledger or other scaffolding component at a location not catered for by any aperture of said rosette and extending in a direction that is not parallel and is not perpendicular to any ledgers secured directly to said rosettes.

Preferably the other scaffold component is a lateral support arm that spans between a building structure and said bridge, said extendible arm comprising at least two elongate arm members that are coupled together in a manner to be able to displace relative each other, a first of said elongate arm members (herein after "first arm") defining a first end of said extendible arm, another of the elongate arm members (herein after "second arm") defining a second end of the extendible arm, the distance between the first and second end able to be varied, and wherein at said first end said first arm presents a first head that can engage to said building structure, and wherein at said second end, said second arm presents a second head that can be secured to said bridge.

Preferably said scaffold structure comprises of a plurality of vertical standards that are interconnected by horizontal ledgers.

Preferably said two elongate arm members are threadingly coupled together to be able to displace relative each other.

Preferably at said first end said first arm presents a first head that can be secured to said building structure.

Preferably at said second end, said second arm presents a second head that can be secured to a said bridge.

Preferably the structure adjacent carries a plurality of said support arms.

Preferably the support arm is engaged to said structure adjacent and carried thereby as it moves up and down the building, the first end of the support arm, engaging said building structure at least from time to time.

Preferably the first and second arms are coaxial each other.

Preferably the first and second arms are in threaded engagement with each other.

Preferably the first and second arms are in threaded engagement to each other.

Preferably the first and second arms are in telescopic engagement to each other.

Preferably the first and second arms are engaged with each other in a turnbuckle manner.

Preferably the two arms are coupled together via an intermediate member.

Preferably said first head comprises a mounting plate that comprises at least one aperture through which a fastener can extend to secure into said building structure.

Preferably said at least one of said first and second arms has dependent therefrom a lever that can be grasped by a person to assist in providing leverage during for the relative rotation of the first to the second arm.

Preferably the first arm comprises a pipe that includes an internally presented thread and said second arm comprises a threaded rod that is able to extend into said pipe.

In a further aspect the present invention may be said to be a scaffold structure system that comprises:
  a. a plurality of scaffolding standards that each comprise of an elongate pipe to which there is secured at least one rosette of a kind that presents a plurality of apertures about the pipe at which a connection to said standard can be established by other scaffolding components, and b. a plurality of ledgers each able to be secured at a said rosette at a said aperture thereof by virtue of each ledger having at its distal ends a head that is of a shape and configuration to allow it to be so secured, and
c. a bridge able to be connected to a said rosette at at least two said apertures thereof, said bridge to locate a said ledger at a location not catered for by any aperture of said rosette.

Preferably a said scaffolding component includes an extendible lateral support arm to span between said building structure and a said bridge, said extendible arm comprising at least two elongate arm members that are coupled together in a manner to be able to displace relative each other, a first of said elongate arm members (herein after "first arm") defining a first end of said extendible arm, another of the elongate arm members (herein after "second arm") defining a second end of the extendible arm, the distance between the first and second end able to be varied, and wherein at said first end said first arm presents a first head that can engage to said building structure, and wherein at said second end, said second arm presents a second head that can be secured to a said bridge.

In a further aspect the present invention may be said to be a bridge for a scaffold structure system that comprises:
a. a plurality of scaffolding standards that each comprise of an elongate pipe to which there is secured at least one rosette of a kind that presents a plurality of apertures about the pipe at which a connection to said standard can be established by other scaffolding components, and
b. a plurality of ledgers each able to be secured at a said rosette at a said aperture thereof by virtue of each ledger having at its distal ends a head that is of a shape and configuration to allow it to be so secured, said bridge adapted and configured to be able to be connected to a said rosette at at least two said apertures thereof, said bridge to locate a said ledger at a location not catered for by any aperture of said rosette.

In still a further aspect the present invention may be said to be a scaffolding system, for use adjacent a wall of a building, that comprises a plurality of standards and a plurality of ledgers that can be connected together to form a scaffold structure adjacent said wall, a plurality of bridges as herein before described and at least one extendible arm comprising a first arm and a second arm said first arm having a first end that presents a fastener to allow said extendible arm to be engage (and preferably be secured to) said wall and said second arm having a second end at which said extendible arm can be secured to said scaffold structure via a said bridge and/or without the use of the bridge, the first and second arms threadingly coupled together to allow the distance between the first and second end to be changed to vary the length of the extendible arm, the extendible arm able to be secured to said wall and to said scaffold structure to tie the two together so as to create lateral support to said scaffold structure from said wall.

Preferably the system is for use intermediate of two walls of a building wherein at least two of said extendible arms are provided the two extendible arms able to be secured to a respective of said two walls and each be secured to said scaffold structure, the variable length of the extendible arms allowing a lateral clamping force to be exerted by said two extendible arms on said scaffolding structure to thereby laterally support said scaffold structure between said two walls.

Preferably the walls are directly facing each other.

Preferably the walls are at an angle to each other.

Preferably the walls are the walls of an elevator shaft.

Preferably the standards each present, spaced along the length of the standard, a plurality of rosettes that each define a coupling zone, the second end of the second arm including a coupling that is complementary to the coupling zone of the rosette to allow said coupling to be secured to said rosette.

Preferably the rosette is of a kind that comprises a sheet metal body and through which a plurality of elongate slots extend, each slot extending radically relative to said standard, said coupling comprising a tongue that can nest or otherwise snugly locate in each said slot.

Preferably the walls are the walls of an elevator shaft and wherein the standards and ledger allow the creating of an at least single bay 3 dimensional scaffold structure that in plan view is substantially quadrilateral in shape, and wherein at least 4 extendible arms are provided one extendible arm to extend outwardly away from each side of scaffold structure to a proximate wall of said elevator shaft.

Preferable there are 8 extendible arms two arms to extend outwardly away from each side of scaffold structure to a proximate wall of said elevator shaft.

Preferable there are 4 extendible arms one arm to extend outwardly away from each side of scaffold structure to a proximate wall of said elevator shaft and wherein each said arm is connected to said structure by a bridge.

Preferably each extendible arm is to extend from a standard.

Preferably each extendible arm is to be engaged with a said standard.

Preferably each extendible arm is to be engaged with said standard at a rosette.

Preferably each extendible arm is to extend horizontally.

Preferably the extendible arm is, when engaged at said rosette, unable to swivel relative said standard.

Preferably the system is for use in a lift shaft of a building.

In even a further aspect the present invention may be said to be a method of erecting a scaffold structure adjacent a building comprising:

erecting at least in part a modular scaffolding structure that comprises a plurality of standards and a plurality of ledgers that can be connected together to form a scaffold structure adjacent building, connecting at least one extendible lateral support arm to said building and to said scaffold structure via a said bridge as herein before described, said support arm able to be adjusted if necessary in length, to span between said building and said scaffold structure.

Preferably the length of the support arm is adjusted when said support arm is connected to at least one of said scaffold structure and said building.

Preferably the length of the support arm is adjusted when said support arm is connected to both said scaffold structure and said building.

In yet a further aspect the present invention may be said to be a scaffolding erected using the system as herein before described.

Preferably said scaffolding is erected in a lift shaft of a building.

In yet a further aspect the present invention may be said to be a scaffold structure lateral support arm comprising at least two components that are threadingly engaged to thereby allow an adjustment in length of the support arm to be made to allow the arm to span varying distances between and be connected to a scaffold structure via a bridge as herein before described and an adjacent building.

Preferably the support arm has a scaffold engageable end and a building engageable end.

Preferably the ends are different.

Preferably the scaffolding engageable end is adapted to be engaged at a rosette of a standard of said scaffold structure.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

The entire disclosures of all applications, patents and publications, cited above and below, if any, are hereby incorporated by reference.

BRIEF DESCRIPTION OF THE DRAWINGS

A preferred form of the present invention will now be described with reference to the drawings of which:

FIG. 21 is a side view of the bridge of FIG. 17, FIG. 22 is a front view of the bridge of FIG. 17, FIG. 23 is a top view of the bridge of FIG. 17, FIG. 24 is a view through section cc of FIG. 23, FIG. 25 is a view through section aa of FIG. 21, FIG. 26 is a view through section bb of FIG. 21, FIG. 27 is a side view of an alternative form of a bridge, FIG. 28 is a front view of the bridge of FIG. 27, FIG. 29 is a plan view of the bridge of FIG. 27, FIG. 30 is a sectional view through section cc of FIG. 29, FIG. 31 is a view through section aa of FIG. 31, FIG. 32 is a view through section bb of FIG. 27, FIG. 34A illustrates a standard with which a non-45 degree bridge is engaged and with which a ledger is coupled, FIG. 34B shows the bridge used in FIG. 34A, FIG. 35A shows a 45 degree bridge being used, engaged to a standard, FIG. 35B shows the bridge used in FIG. 35A, FIG. 36A shows an alternative non-45 degree bridge being used for connecting a ledger to a standard, FIG. 36B shows the bridge of FIG. 36A, FIG. 37 shows a scaffold structure erected in an elevator shaft, wherein bridges are used at the corner of the structure to allow a support arm to project therefrom and to the shaft wall to provide lateral support, FIG. 39 shows a plan view down an elevator shaft for example, where a service cart or lift is positioned, the cart carrying extendible arms that project to each make contact with a wall of the shaft such that in concert they can operate to provide lateral stability to the cart, FIG. 40 shows the cart, suspended from a cable inside the lift shaft, in a side cross sectional orientation.

DETAILED DESCRIPTION OF THE INVENTION

Figure 1:
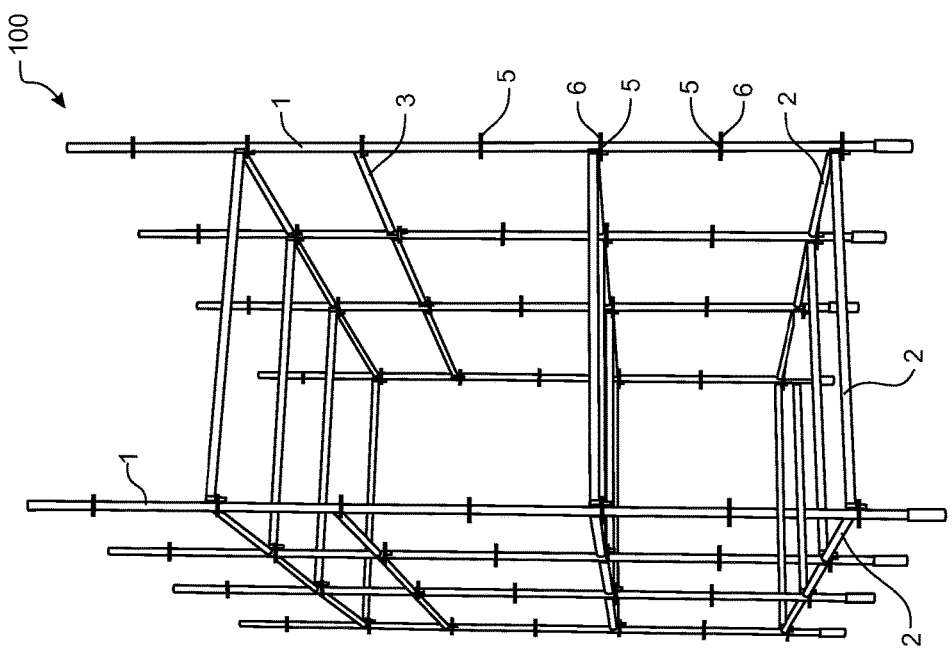
FIG. 1 is a perspective view of a scaffold structure comprising of a plurality of standards, ledgers and guard rails connected together as a modular system.

The invention may be described with reference to components forming part of a modular scaffolding system, parts of which are already known. In FIG. 1 for example there is shown a scaffold structure 100 that comprises of a plurality of standards 1. The standards 1 preferably consist of a metal pipe that, at preferably regular intervals, has secured thereto a rosette 6. The rosette 6 may be made from a sheet metal 6 and is preferably substantially planar. The rosette 6 includes a central aperture 7 which is of a shape and configuration to snugly fit about the pipe of the standard 1. The rosette 6 may be welded to the pipe of the standard 1 to become securely fastened thereto. The rosette 6 may include a plurality of apertures 8. The apertures 8 may for example be slots that are positioned to radiate away from the pipe of the standard 1 and are preferably equispaced about the pipe of the standard 1. The slots 8 are preferably elongate slots and may be substantially rectangular in plan shape. Alternative shapes of such rosette apertures may be provided by the rosette.

Able to form part of the scaffolding structure 100 are a plurality of ledgers 2. The ledgers may comprise elongate linear pipes, U or RHS sectioned members. The ledgers 2 have connection heads at each end that are of a shape and configuration to allow for the ledger to become secured at an aperture of a rosette of a standard. Such a head may comprise projections 10. These projections 10 are of a shape to allow for these to be located into a slot 8 of a rosette 6. Each projection 10 may be welded to the end of the pipe section of the ledger. The projection 10 presents a leg 11 that can be received into a slot 8 of a rosette 6. The leg 11 may be a projection. The leg may be tapered so that it can be conveniently located into the slot and become wedged to the standard. An aperture 12 may be provided through the leg 11 to allow for a fastener to extend through. Such can ensure that the ledger cannot be removed from the rosette 6. The fastener may for example be a split pin or ring or other arrangement that can help secure the ledger to the rosette 6. Preferably the leg is made of a sheet metal of a thickness that is substantially the same as the width of the slot 8 of the rosette. This allows for the leg to have a very snug fit in a slot of a rosette and thereby become secured without being able to swivel relative to the standard. This allows for a simple erection of a scaffold structure.

Figure 3:
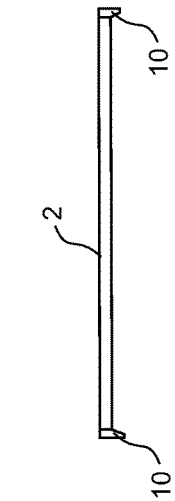
FIG. 3 is a ledger that may be used in the modular system.
Figure 5:
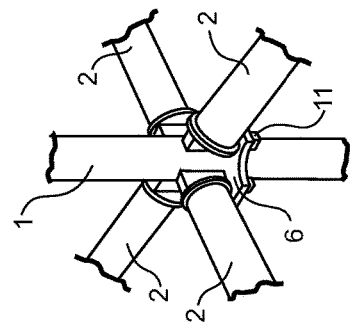
FIG. 5 is a perspective view showing a scaffolding standard to which there is connected four separate ledgers.

As can be seen in FIG. 5 a plurality of ledgers may be engaged at a single rosette of a standard 1 to each radiate away from the standard 1 in predefined and different directions.

Figure 8:
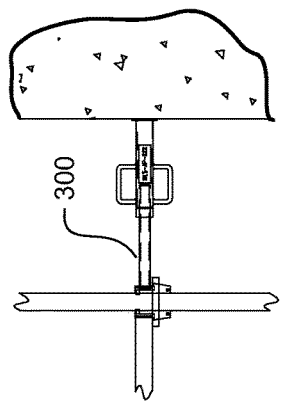
FIG. 8 is a close up view of area A of FIG. 6.
Figure 7:
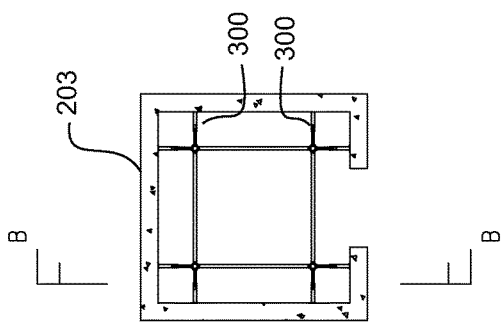
FIG. 7 is a plan view of FIG. 6.
Figure 6:
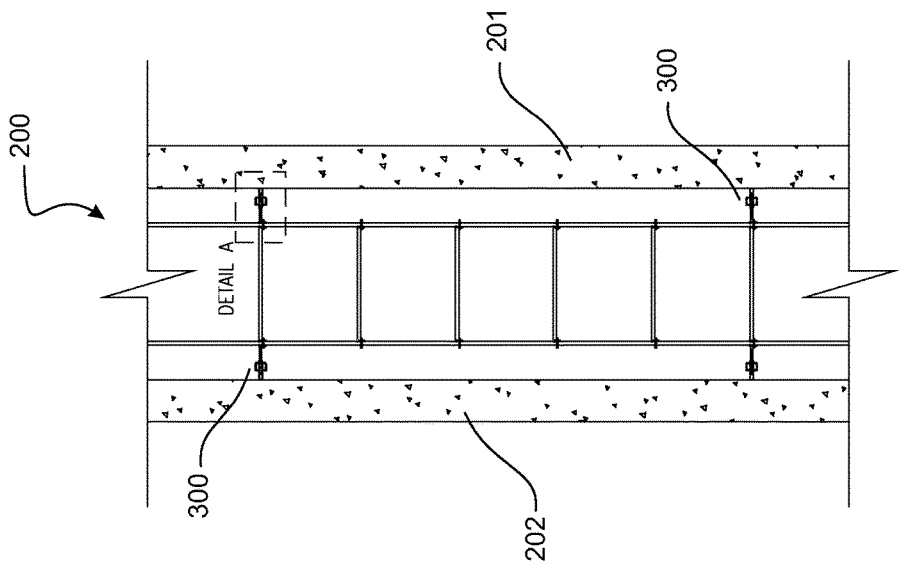
FIG. 6 is a sectional view of part of a building such as part of an elevator shaft within which a scaffold structure can be erected and taken at section BB of FIG. 7.
Figure 9:
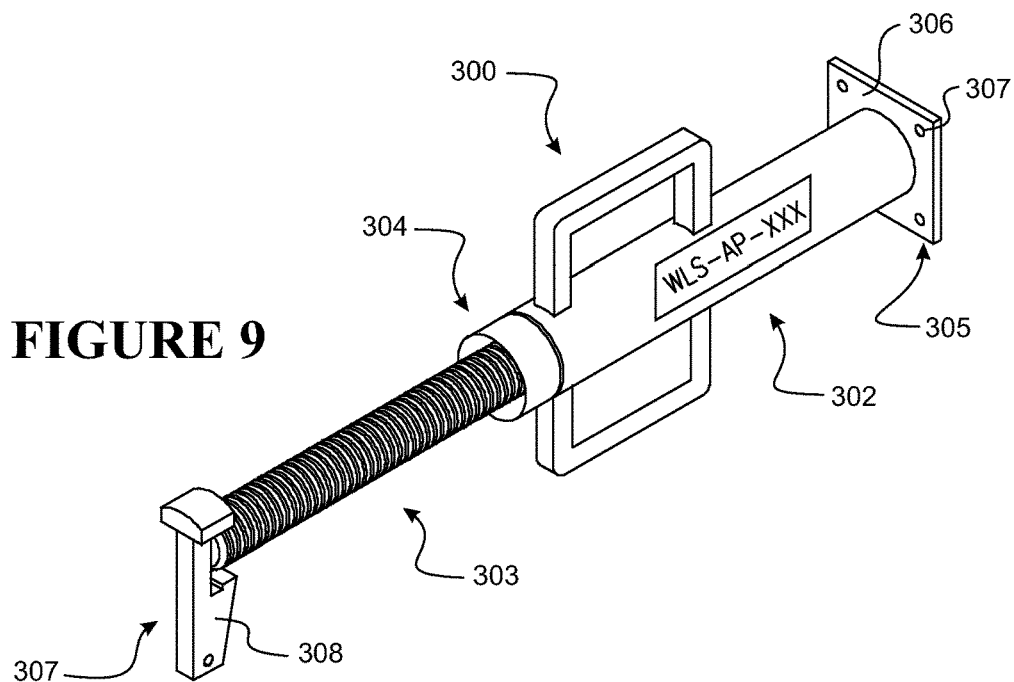
FIG. 9 is a perspective view of an extendable arm.
Figure 10:
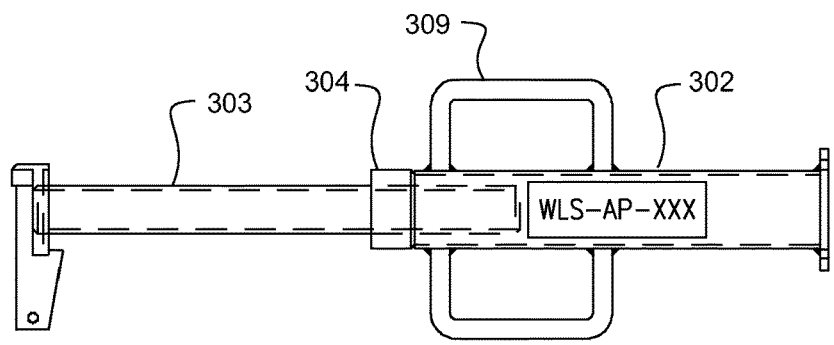
FIG. 10 is a side view showing some hidden detail of the extendable arm of FIG. 9.
Figure 11:
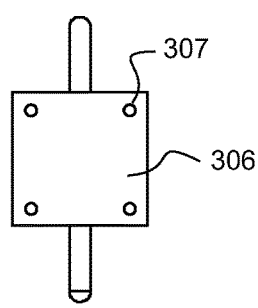
FIG. 11 is an end view of the arm of FIG. 10.
Figure 12:
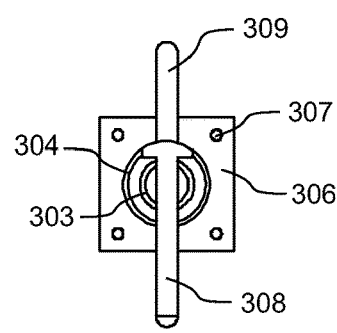
FIG. 12 is a view from the opposite end of the arm.

With reference to FIG. 6-8 there is shown a scaffold structure 200 located intermediate of two walls 201 and 202 of a building. The two walls may be facing walls or may be walls that are at an angle to each other. In the example shown in FIG. 6-8, the two walls shown in FIG. 6 are facing walls of an elevator shaft. FIG. 7 illustrates a plurality of walls of an elevator shaft 203 and within which the scaffold structure 200 is erected.

In order to provide lateral stability to the scaffold structure the scaffold structure is supported, at discrete locations by a plurality of extendable lateral support arms 300. Such support arms 300 may be provided at a plurality of discrete locations to extend between the scaffold structure 200 and an adjacent wall 201 (etc). The support arm is preferably adjustable in length.

In a preferred form the support arm comprises of two arm members, a first arm 302 and a second arm 303. The two arms are threadingly coupled together. In the preferred form the second arm 303 is a threaded rod whereas the first arm 302 includes an internally threaded region 304 that can receive the threaded rod 303. The first arm 302 includes a first head 305 that is presented at a first distal end of the support arm 300 for engagement to a wall or other part of a building structure. The first head 305 may for example be a plate 306 having a plurality of apertures 307 through which fasteners can extend to engage to the wall of a building structure.

The second arm 303 includes a second head 307 that is configured and adapted to be able to conveniently engage and be secured to the scaffold structure 200. The second head is preferably defined at the second distal end of the support arm 300. The second head 307 preferably comprises a tongue 308. The tongue is preferably planar and of a width that is complimentary to the width of a slot of a rosette of modular scaffolding system with which the support arm may be used. As can be seen the tongue 308 is of a shape to allow for the tongue to drop into the aperture of a rosette and thereat become secured to a standard of a scaffold structure.

It is desirable for the support arm to become secured to a scaffold structure not at a ledger but at a standard and preferably at a rosette of a modular scaffold system standard to allow for a lateral force transfer to occur to the scaffold structure via the support arm to the wall of the building structure. Indeed in a preferred form the support arm is engaged to a standard at a rosette at which ledgers also extend from as part of the scaffold structure so as to provide a solid anchoring point with little or no flexibility in the standard at the rosette by virtue of other scaffolding components being connected thereto. FIG. 7 shows a preferred assembly of a scaffold structure where support arms are utilised. It is desirable for two support arms to extend from a rosette, one support arm extending in one direction from the scaffold structure to an adjacent wall and a second support arm extending substantially perpendicular thereto and extending to an adjacent wall of the building structure. The adjacent walls are preferably at right angles to each other. Alternatively the first and second support arms could extend to the same wall and triangulate with the wall and/or the scaffold structure.

In a preferred form the support arm 300 comprises of two arm members 302 and 303. These arm members are preferably elongate and preferably extend coaxial relative to each other.

In the preferred form the two arms 302 and 303 are directly engaged to each other. Alternatively they may be engaged with each other but wherein an intermediate member may be provided. Such an intermediate member may be a separate threaded component that engages to threaded portions of the first and second arm 302 and 303 and thereby form a turn buckle style arm. This allows for the intermediate member to be rotated when the first and second arms are secured in place, yet allow the overall length of the support arm 300 to be adjusted. A telescopic configuration is also anticipated which may or may not include lock out features to allow the support arm to be adjustable yet still be established in a rigid configuration. Such may provide for a spring biased telescoping or similar.

In use, the preferred form of the support arm may be adjusted in length by relative rotation of the threaded components of the support arm 300 so that the distance between the first and second distal ends of the support arm can be varied to establish an overall length that is suitable to allow for the support arm 300 to extend between the scaffold structure and an adjacent wall and become coupled to both. Alternatively the support arm 300 may first be engaged to a rosette of a standard and then its length may be adjusted until the first head 305 presses against an adjacent wall. Alternatively the first head may first be secured to an adjacent wall and the length of the support arm 300 may then be adjusted so that it can span between the adjacent wall and the scaffold structure. Handles 309 may be provided to one or both of the first and second arm 302 and 303 to facilitate the relative rotation of the threaded components to allow for the length to be adjusted.

The use of a plurality of support arms can allow for a scaffold structure to obtain lateral support and also be clampingly engaged between facing or adjacent walls of a building. Pressure can be applied via the support arms by adjustment of the threaded components to change the length of a or each of any of the support arms. This can allow for a force to be applied to the scaffold structure to ensure a rigid connection is established between the adjacent walls of the building and the scaffold structure.

Whilst the support arm herein described is preferably utilised where a scaffold structure is desirous of being supported relative to two facing or otherwise adjacent walls so as to allow for a plurality of support arms to be utilised, it is also envisaged that the support arm may be utilised for supporting a scaffold structure merely adjacent one planar wall of a building. The support can be adjusted so as to ensure that if substantially vertical orientation of a or the vertical standards is maintained by virtue of providing lateral support to the scaffold structure from the building.

Figure 43:
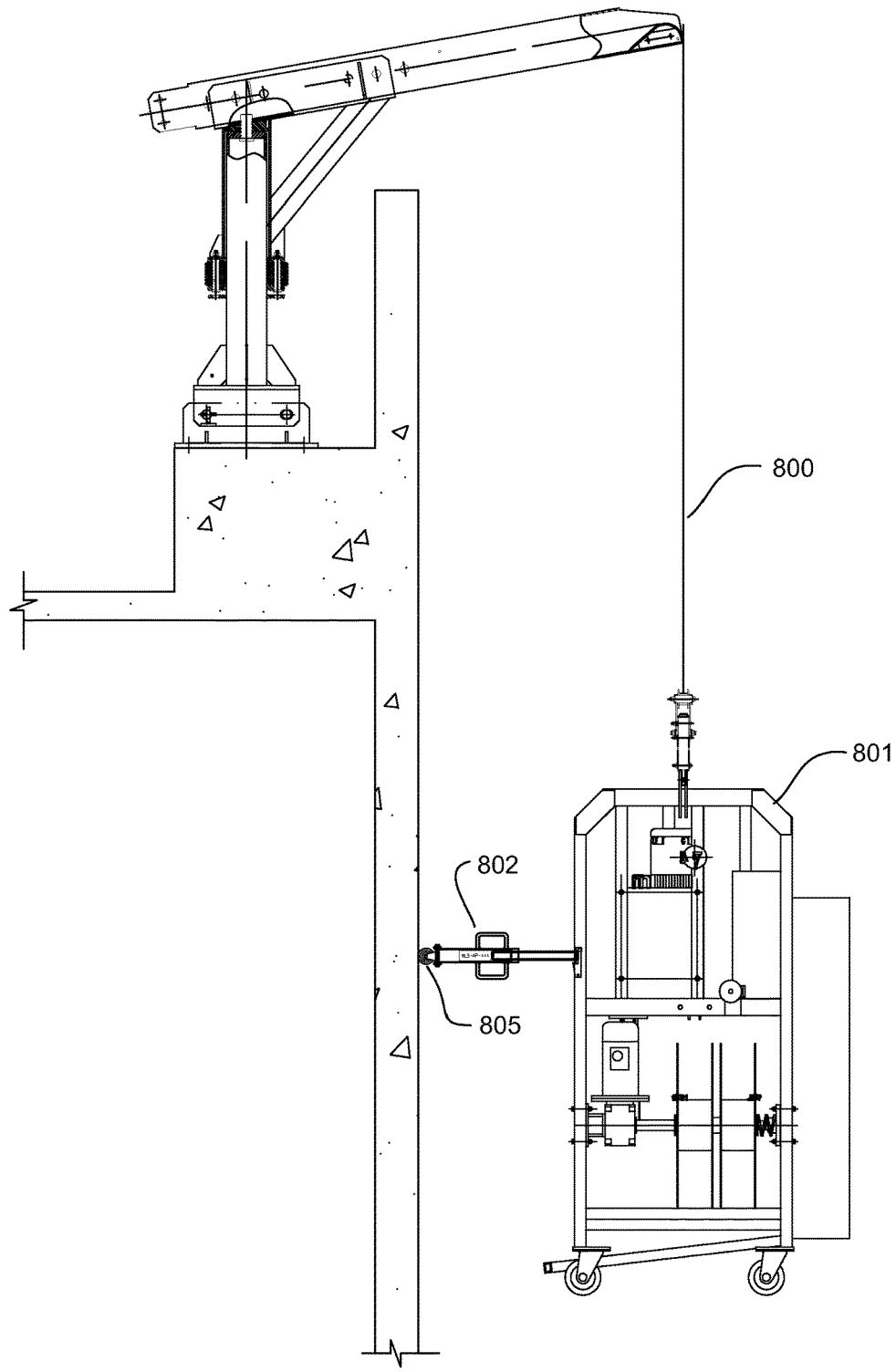
FIG. 43 is a side view of part of a building showing a swing stage or service cart, suspended adjacent the building and showing how the extendible arm of FIGS. 15 and 16 may be utilised for the purposes of keeping separation between the building and the swing stage.

The support arm may also be utilised in a mode where it is secured to a service car or swing stage that maybe suspended adjacent a building wall. As shown in FIG. 39 or 40 a service car is shown inside an elevator shaft, the service car suspended by a cable 800. A plurality of support arms 802 may be secured to and project away from the service car 801 to as to extend to an adjacent wall of the shaft. Such a configuration can allow for the service car to get lateral stability as it travels up and down or is stationary inside the lift shaft. As a result workers in the car can perform functions without the lift car swaying relative the building. So whilst in a preferred form the support arm may be used with scaffolding, it can be seen that other applications for the support arm exist. Indeed as shown in FIG. 43, the service car or swing stage 801 may be suspended by a crane exterior of a building and via a cable 800. The support arm may project from the service car towards a face of the building and contact the building. A plurality of support arms may be so mounted and travel with the service car as it moves up and down.

Figure 41:
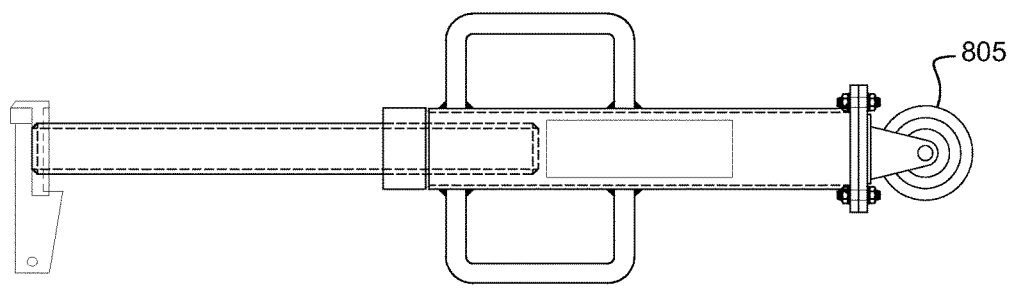
FIG. 41 is a side view with hidden detail showing of a variation of the extendible arm that may be utilised in the application as described with reference to FIGS. 39 and 40 and 43.
Figure 42:
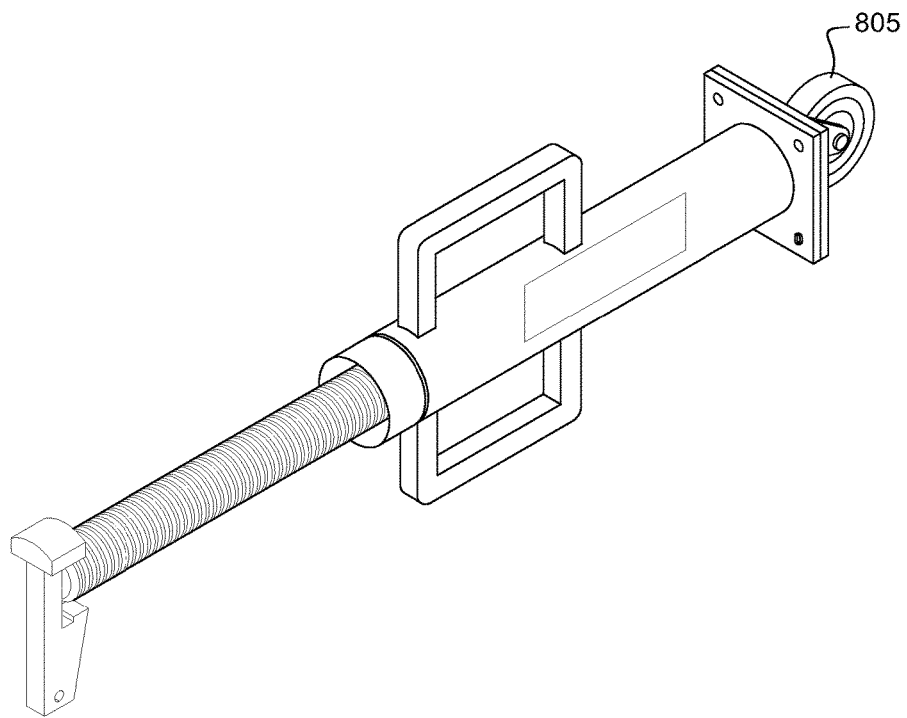
FIG. 42 is a perspective view of the extendible arm of FIG. 41.

To ensure that such up and down movement is not impaired and/or causes no or little damage to the building, the support arm may include a contact roller 805. This is more clearly seen in FIGS. 41 and 42. The contact roller may include a wheel that has a tire or other suitable material on it that make if compatible with the surface over which it is to roll. The roller may be mounted in a castor like manner so that it can swivel. This may be important where for example lateral stability in a direction parallel to the adjacent building surface is not able to be achieved. The service car may for example sway from side to side parallel to the building and a castor wheel arrangement can allow for the contact roller to passively adjust its orientation to allow for up and down rolling contact as well as side to side rolling contact with the building.

The tires may be pneumatic tires. This allows for some impact damage and dampening to occur if a swing stage is moved away from the building and then comes back at the building. In addition or alternatively, the two arm portions of the support arm may be able to move relative to each other in a manner to that provides such shock absorption. A spring, ram or other element may be included sot that the two arm portions can displace relative to each other upon the application of a force.

As mentioned above, the rosette of the kind as shown in FIG. 2 comprises of four slots each to allow for ledgers to extend from a standard at 90 degrees to each other. Likewise a support arm may be so disposed.

However it may be desirable for a ledger or the support arm as hereinbefore described to be presented for projecting from the vertical standard 1 in a different direction. Given that complementary nature of the slot and ledger, a ledger cannot swivel relative to a standard without wrenching or twisting the leg 11 of the projection 10 of the ledger.

Figure 14:
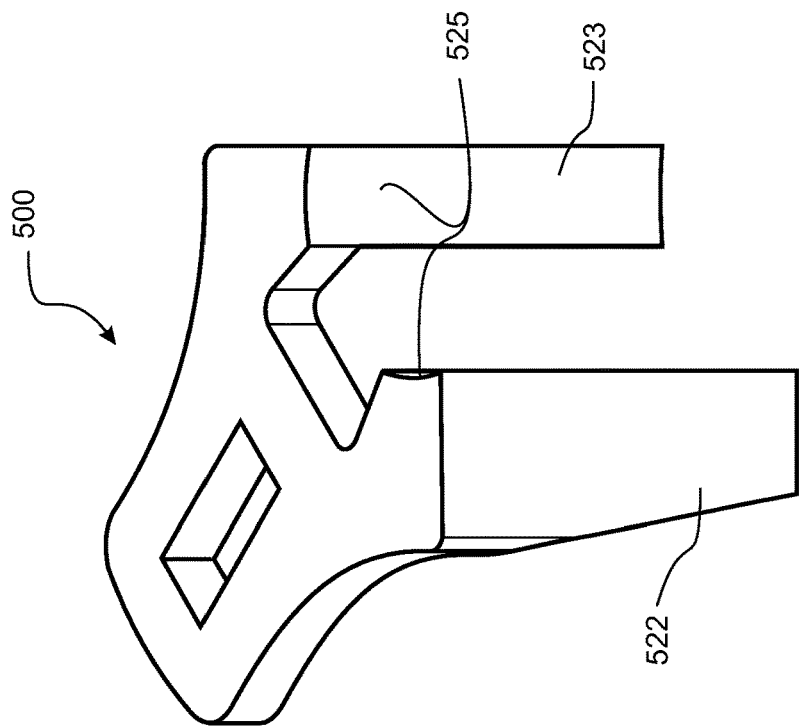
FIG. 14 is a perspective view from another direction of the bridge.
Figure 13:
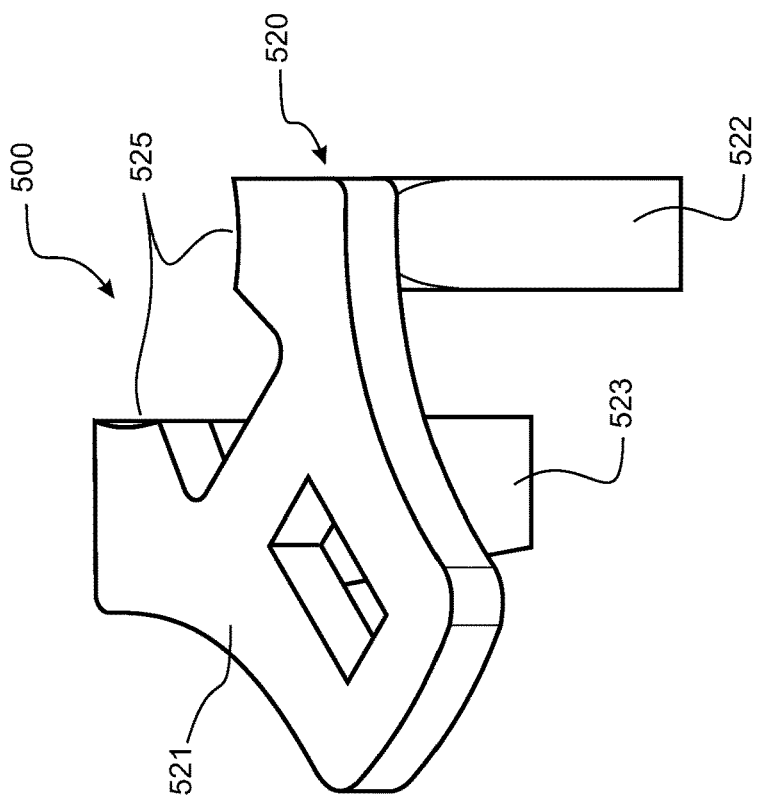
FIG. 13 is a perspective view of a bridge.
Figure 16:
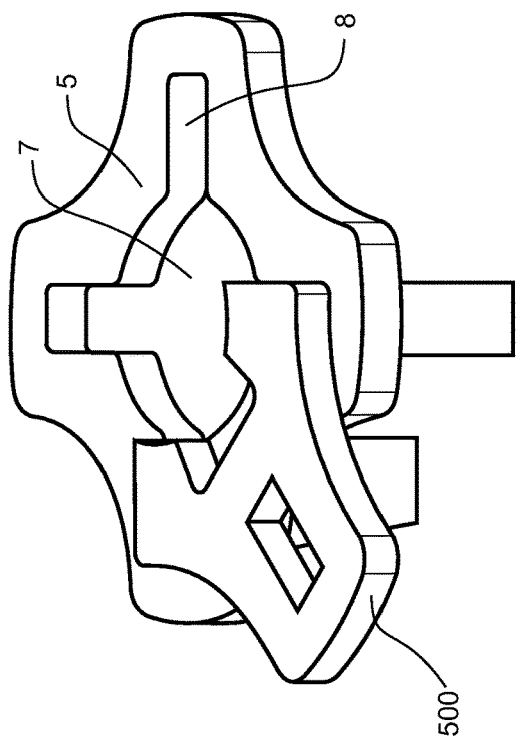
FIG. 16 illustrates the bridge engaged to the rosette in the absence of the standard.
Figure 15:
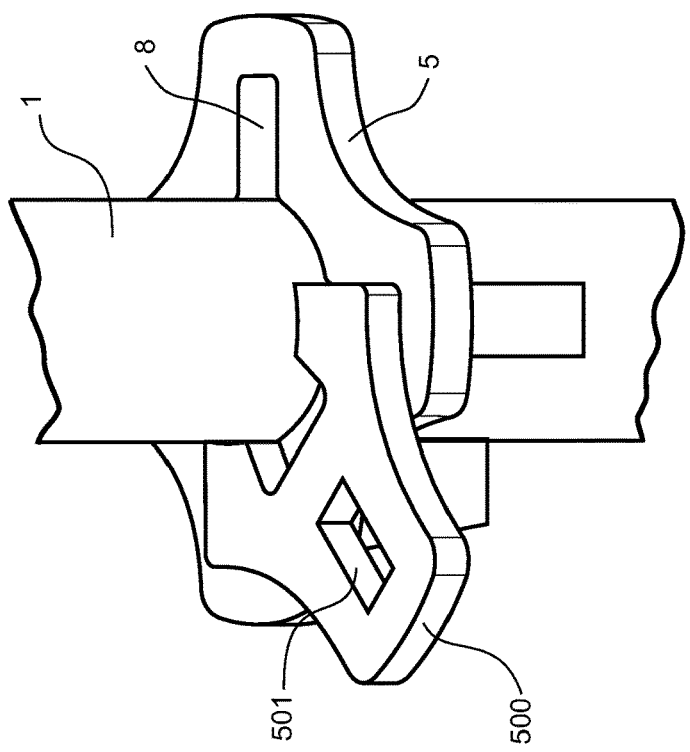
FIG. 15 illustrates the bridge engaged to a standard at a rosette.

To provide greater flexibility of configuration, a bridge 500 as for example shown in FIGS. 13 and 14 can be used. The bridge 500 is a discrete item. It may form part of a kit of parts of a scaffolding system. The bridge is capable of connection to a rosette 6 in a manner to register at at least two apertures 8 of the rosette. These are preferably immediately adjacent apertures but need not necessarily be so. This can for example be seen with reference to FIGS. 15 and 16.

The bridge 500 may present a fastening region 501 at which scaffolding components can become secured to the bridge and thereby become secured to the rosette 6 and its associated standard 1. The fastening region 501 may be of a similar or like shape to the slot 8 of the rosette so that scaffolding components such that ledgers 2, that can engage with a slot 8 of a rosette, can also locate with the fastening region 501 of the bridge. Therefore the fastening region 501 may for example be a slot that is of a similar or identical plan shape or identical plan shape to the slot 8 of the rosette.

The fastening region is presented by the bridge 500 in a location that is not catered for by any aperture 8 of the rosette when the bridge is engaged at the rosette. Such a location may be in a position which presents the slot 501 radially different and/or positionally different to the slot 8 of the rosette and/or diametrically different. The fastening region presented by the bridge 500 is therefore in a location (whether it's the position and/or rotation or orientation that is different to the apertures 8 of the rosette).

In the example shown of the bridge of FIGS. 13 and 14 the aperture 501 is positioned on a radial line extending from the standard that is intermediate of the radial lines at which two adjacent slots 8 of the rosette are provided. The slot 501 hence has a longitudinal direction that is substantially 45 degrees to both the adjacent slots with which the bridge is engaged.

The bridge 500 may engage with two adjacent slots of the rosette or may engage with non-adjacent slots. In the preferred form the bridge engages with at least two slots of the rosette but in an alternative form may engage more than two slots.

The aperture 501 of the bridge allows for scaffold components to extend from a standard in a direction which is not catered for by the slots of the rosette 8. The bridge may also allow for the position of engagement of scaffolding components thereto to be different from locations at where scaffolding components can be engaged to the standard via the rosette slots 8.

Figure 2:
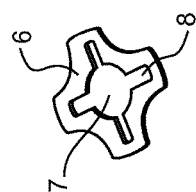
FIG. 2 is a perspective view of a rosette that may be affixed to the standard.
Figure 4:
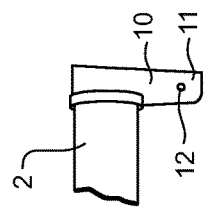
FIG. 4 is a close up view of an end of a ledger.

The bridge 500 preferably comprises a body portion 520 that includes a bridging section 521 from which there project at least two prongs 522 and 523. The prongs 522 and 523 preferably project in a direction parallel to each other. The prongs are able to drop into slots 8 of a rosette. The prongs 522 and 523 may have a slight tapered shape to them so that they can become wedged in a slot. Alternatively the bridge 500 may include a bridging member 521 and alternative connection regions to allow for the bridge 500 to become secured at apertures of a rosette. The pronged version of the bridge 500 is convenient for use with a scaffolding system that utilises a rosette of a kind as shown in FIG. 2. The prongs 522 and 523 may include arcuate surfaces 525 that are of a radius that is complimentary to the diameter of the pipe of the standard. The rosette with which the present invention is capable of being used with, provides its slots 8 in a manner so that the pipe of the standard 1 defines at least part of the boundary of the slot. The arcuate surfaces 525 of the prongs are hence, when located in a respective slot of a rosette, able to locate directly against the pipe of the standard 1. In alternative forms the surfaces 525 may not be arcuate but still present a pipe contact surface. This allows for force transfer to occur when a load is placed on the bridging portion 521 of the bridge 500 to the pipe of the standard 1. This will hence offer certain rigidity and provide a secure registration of the bridge 500 with a standard 1.

Figure 17:
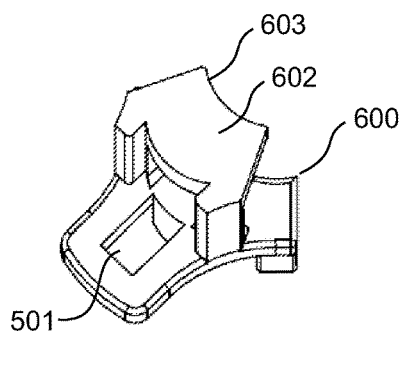
FIG. 17 is a perspective view of an alternative configuration of a bridge.
Figure 18:
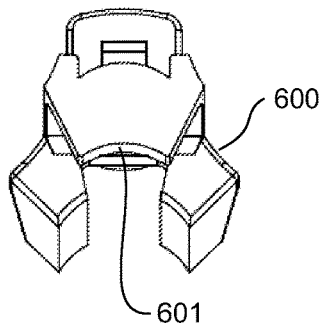
FIG. 18 is a perspective view from another direction of the bridge of FIG. 17.
Figure 19:
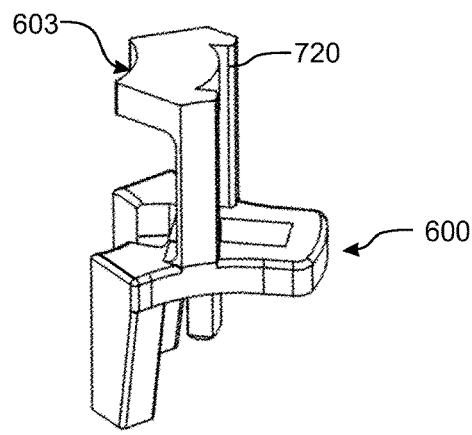
FIG. 19 is an alternative view of the bridge of FIG. 17.

To provide further secure location against a standard a bridge 600 is shown for example in FIGS. 17-19 may be utilised. The bridge 600 comprises the same or similar features of the bridge 500 shown in FIGS. 13 and 14 with the addition of an extension member 602. The extension member 602 projects in a direction opposite to the prongs and includes a standard engaging surface 603. This standard engaging surface 603 may also be arcuate and of a radius complimentary to the diameter of the pipe of the standard. This allows for lateral support to be gained by the bridge 600 at a distance away from where the prongs may receive lateral support from the rosette and pipe of the standard 1 to thereby offer greater secured location of the bridge 600 at a rosette of a standard.

Figure 20:
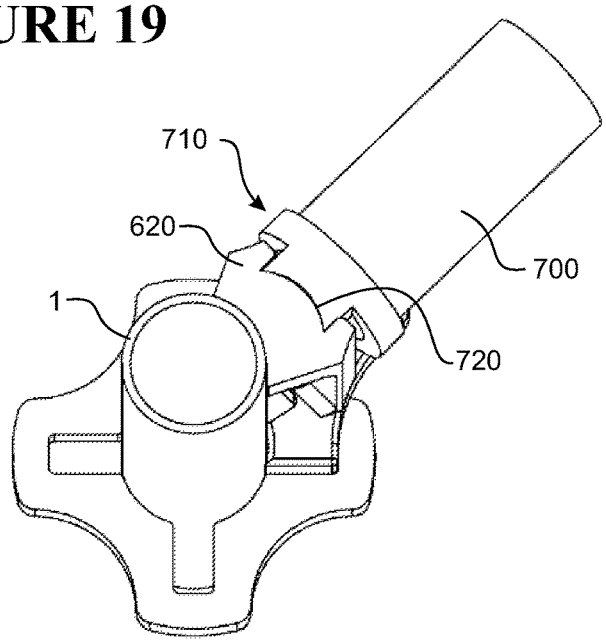
FIG. 20 illustrates the bridge of FIG. 19 engaged to a standard and having received a ledger.

The extension member 602 may also present a registration surface or surfaces for engagement by a scaffolding component such as scaffolding component 700 shown in FIG. 20. The scaffolding component 700 may for example be a ledger having a head 710 that includes a feature that can register with the registration region 720 of the extension 602 of the bridge 600. This feature of the ledger (or other component), being a distance away from where the scaffolding member 700 engages with its tongue into the slot 501 of the bridge, can allow for a transfer of force to be applied by the scaffolding member 700 to the bridge 600, in an effective manner, to the pipe of the standard 1. For example a lifting of the scaffolding member 700 will allow for a force to be applied via the registration region 720 and via the extension member 602, to the pipe of the standard 1.

Where a bridge is to be provided to present its slot 501 in a direction that may not be at 45 degrees to slots of the rosette, an asymmetric bridge may be provided as for example shown in FIGS. 27-32. Alternatively the slot 501 may be provided in a different orientation in the bridging portion 521 of the bridge. However it is desirable to present the slot so that it extends radially relative to the pipe of the standard 1.

The bridge may also offer a location for the support arm 300 to extend obliquely to the general rectilinear plan shaped scaffold structure that may be erected adjacent a building and/or in a lift shaft as shown in FIG. 37. With the provision of a bridge 500 the support arm can project from the scaffold structure in order to it to provide the desired support at that portion of the scaffold structure where otherwise two support arms may have been desirable as shown in FIG. 7.

The invention claimed is:

1. A bridge configured to connect to a scaffolding standard, the scaffolding standard comprising at least one rosette secured to an elongate pipe, the at least one rosette having a plurality of angularly spaced apertures each residing at a respective side of a region of the rosette, and each positioned at a respective location about the pipe at which the standard can be connected to other scaffolding components, the bridge including a bridge portion and at least two angularly spaced connectors each connector releasably connected to a respective one of the apertures of the rosette, and the bridge portion including a fastening region at a location other than the locations of the apertures of the rosette when the connectors are connected to the apertures of the rosette to allow a scaffolding component to be secured to the bridge and positioned and supported by the bridge at a location other than the locations of the apertures of the rosette, wherein a space between the spaced connectors permits the region of the rosette to be received between the connectors of the bridge, wherein the bridge portion supports the at least two spaced connectors, wherein each connector is a prong having a free end, and the two prongs are spaced completely apart along an entire length thereof, and each prong projects in a respective direction from the bridge portion, wherein the bridge portion of the bridge and the prongs are shaped and configured so as to allow the bridge portion of the bridge to rest on the region of the rosette when the prongs are fully engaged with the apertures, wherein the fastening region is on, and the bridge portion extends only along, a radial plane that is not parallel to the direction of projection of the prongs and extends radially relative to two adjacent apertures of the rosette when the connectors are connected to the apertures of the rosette, wherein the bridge portion is a planar body that includes a continuous and endless border wall located between a top surface of the bridge portion and a bottom surface of the bridge portion, wherein the continuous and endless wall defines the outer perimeter of the bridge portion, and wherein the prongs project from the bottom surface of the bridge portion and are isolated from one another along the entire length thereof from the bottom surface to the free ends thereof.

2. A bridge as claimed in claim 1, wherein the fastening region is located at a location between two radial lines passing through two adjacent apertures of the rosette when the connectors are connected to the apertures of the rosette.

3. A bridge as claimed in claim 1, wherein the fastening region is located at a location between radial lines passing through two apertures of the rosette when the connectors are connected to the apertures of the rosette.

4. A bridge as claimed in claim 1, wherein the fastening region includes a feature having a shape complementary with a part or parts of a scaffolding component that is configured to connect to an aperture of the rosette.

5. A bridge as claimed in claim 1, wherein the fastening region includes an aperture.

6. A bridge as claimed in claim 1, wherein the fastening region includes a slot, the slot extending in an elongate direction that lies in a notional plane that is parallel to an elongate direction of a standard, the notional plane not passing through the apertures of the rosette with which the bridge is engaged when the connectors of the bridge are connected to the apertures of the rosette.

7. A bridge as claimed in claim 1, wherein the prongs project in a same direction and are parallel to each other.

8. A bridge as claimed in claim 1, wherein the prongs are shaped and configured to engage with the pipe of a standard when fully engaged into a respective aperture of the rosette of the standard.

9. A bridge as claimed in claim 1, wherein the bridge is at least partially staple shaped.

10. A bridge as claimed in claim 1, wherein the bridge portion of the bridge defines a landing on which the scaffolding component can rest when engaged at an aperture in the bridge.

11. A bridge as claimed in claim 1, wherein the bridge also comprises a pipe abutment upwardly located from the bridge portion to abut the pipe of the standard at a location above the bridge portion when in use.

* * * * *